(12) United States Patent
Herz et al.

(10) Patent No.: US 8,279,893 B2
(45) Date of Patent: Oct. 2, 2012

(54) SYSTEM AND METHOD FOR COMMUNICATING DATA UTILIZING MULTIPLE TYPES OF DATA CONNECTIONS

(75) Inventors: William Samuel Herz, Hayward, CA (US); Andrew C. Fear, Cedar Park, TX (US)

(73) Assignee: NVIDIA Corporation, Santa Clara, CA (US)

( * ) Notice: Subject to any disclaimer, the term of this patent is extended or adjusted under 35 U.S.C. 154(b) by 783 days.

(21) Appl. No.: 11/454,390

(22) Filed: Jun. 16, 2006

(65) Prior Publication Data

US 2007/0291774 A1 Dec. 20, 2007

(51) Int. Cl.
*H04J 3/24* (2006.01)
(52) U.S. Cl. .................... 370/473; 370/535
(58) Field of Classification Search .............. None
See application file for complete search history.

(56) References Cited

U.S. PATENT DOCUMENTS

| | | | | |
|---|---|---|---|---|
| 5,966,642 A * | 10/1999 | Raffel | ............ | 455/512 |
| 6,389,467 B1 | 5/2002 | Eyal | | |
| 6,484,199 B2 | 11/2002 | Eyal | | |
| 6,542,742 B2 * | 4/2003 | Schramm et al. | ........ | 455/436 |
| 7,089,014 B2 * | 8/2006 | Brown et al. | ........ | 455/450 |
| 7,366,165 B2 * | 4/2008 | Kawarai et al. | ........ | 370/366 |
| 7,369,530 B2 * | 5/2008 | Keagy | ........ | 370/340 |
| 7,626,931 B2 * | 12/2009 | Wu et al. | ........ | 370/232 |
| 2001/0021925 A1 | 9/2001 | Ukigawa et al. | ........ | 705/39 |
| 2002/0078467 A1 * | 6/2002 | Rosin et al. | ........ | 725/110 |
| 2002/0141393 A1 | 10/2002 | Eriksson et al. | ........ | 370/352 |
| 2003/0048783 A1 * | 3/2003 | Tateoka | ........ | 370/390 |
| 2003/0076803 A1 * | 4/2003 | Chuah | ........ | 370/338 |
| 2004/0054798 A1 * | 3/2004 | Frank et al. | ........ | 709/229 |
| 2004/0081127 A1 * | 4/2004 | Gardner et al. | ........ | 370/338 |
| 2004/0213193 A1 * | 10/2004 | Longoni | ........ | 370/342 |
| 2006/0062250 A1 * | 3/2006 | Payne, III | ........ | 370/468 |
| 2006/0089997 A1 | 4/2006 | Inokuchi | | |
| 2006/0171397 A1 * | 8/2006 | Watkinson | ........ | 370/395.2 |
| 2006/0182103 A1 * | 8/2006 | Martini et al. | ........ | 370/389 |
| 2007/0140235 A1 * | 6/2007 | Aysan et al. | ........ | 370/389 |
| 2007/0245010 A1 * | 10/2007 | Arn et al. | ........ | 709/223 |

FOREIGN PATENT DOCUMENTS

| | | |
|---|---|---|
| JP | 06188936 A2 | 7/1994 |
| JP | 2000261457 A | 9/2000 |
| JP | 2000324155 A | 11/2000 |
| JP | 2004240514 A | 8/2004 |
| KR | 2002/0047181 | 6/2002 |
| WO | 9856188 A2 | 12/1998 |
| WO | 99/59293 | 11/1999 |

(Continued)

OTHER PUBLICATIONS

Final Office Action Summary from U.S. Appl. No. 09/942,047, mailed on Apr. 30, 2009.

(Continued)

*Primary Examiner* — Nittaya Juntima
*Assistant Examiner* — Rhonda Murphy
(74) *Attorney, Agent, or Firm* — Zilka-Kotab, PC (57) ABSTRACT

A system and method are provided for communicating data over a network. In some embodiments relating to data transmission, data is divided into a plurality of portions, such that the portions may be transmitted utilizing a plurality of different types of data connections. In other embodiments relating to data receipt, a plurality of portions of data is received utilizing a plurality of different types of data connections, after which the portions may be reassembled.

18 Claims, 5 Drawing Sheets

FOREIGN PATENT DOCUMENTS

| WO | 00/67435 | 11/2000 |
| WO | 01/22662 | 3/2001 |
| WO | 0156244 A1 | 8/2001 |
| WO | 02/45369 | 6/2002 |

OTHER PUBLICATIONS

Korean Office Action Summary from application No. 10-2007-59129 mailed on Mar. 30, 2009.
Chinese Office Action Summary with English translation from application No. 2007101119573 mailed on Nov. 6, 2009.
Notice of Reasons for Rejection from Japanese Patent Application No. 2007-159367, dated Dec. 14, 2010.
Notice of Reasons for Final Rejection from Japanese Patent Application No. 2007-159367, dated Apr. 19, 2011.
Notice of Preliminary Rejection from Korean Application No. 10-2007-0059129, dated Aug. 21, 2009.
Office Action from the State Intellectual Property Office of China for Chinese Patent Application No. 200710111957.3, dated Sep. 20, 2010.
Office Action from Taiwan Patent Application No. 096121578 dated Aug. 30, 2011.
Notice of Final Rejection from Japanese Patent Application No. 2007-159367, dated Feb. 21, 2012.
Office Action from Chinese Patent Application No. 200710111957.3, dated Dec. 31, 2011.

* cited by examiner

SYSTEM AND METHOD FOR COMMUNICATING DATA UTILIZING MULTIPLE TYPES OF DATA CONNECTIONS

FIELD OF THE INVENTION

The present invention relates to networking, and more particularly to communicating data over a network.

BACKGROUND

Current networked environments (e.g. home, office, etc.) are generally utilized for the efficient sending and receiving of data. In addition, each of such environments traditionally relies on a single network for transferring all of such data. Although faster networking protocols and higher bandwidth data connections are provided to improve the efficiency of transferring all types of data, such single networked environments are still susceptible to many problems that result in the inefficient transfer of data.

Specifically, traditional networks are prone to quality of service issues, dropped connections, interrupted bandwidth sharing, etc. Such issues therefore result in dropped packets and substandard networking service. In one particular example, streaming encoded video to a node in such traditional single networked environment may potentially run into any of the above described problems, thus causing a viewing experience associated with the streaming video to be interrupted.

There is thus a need for overcoming these and/or other problems associated with the prior art.

SUMMARY

A system and method are provided for communicating data over a network. In some embodiments relating to data transmission, data is divided into a plurality of portions, such that the portions may be transmitted utilizing a plurality of different types of data connections. In other embodiments relating to data receipt, a plurality of portions of data is received utilizing a plurality of different types of data connections, after which the portions may be reassembled.

DETAILED DESCRIPTION

Figure 1:
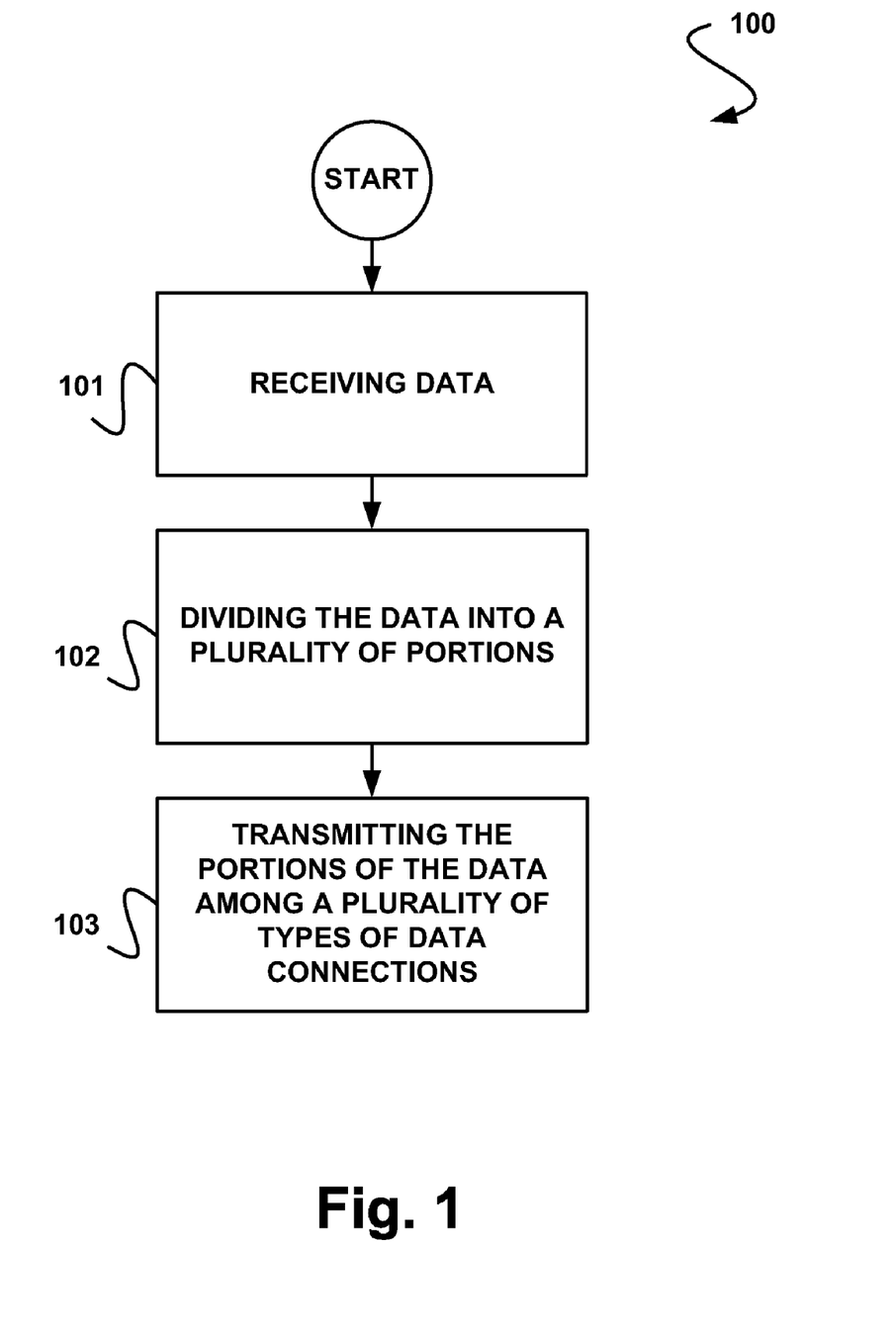
FIG. 1 shows a method for communicating data utilizing a plurality of types of data connections, in accordance with one embodiment.

FIG. 1 shows a method 100 for communicating data utilizing a plurality of types of data connections, in accordance with one embodiment. As shown in operation 101, data is initially received for transmission purposes. Of course, the data may be received from any source, device, etc., various examples of which will be set forth during the description of subsequent figures.

In various embodiments, the data may include raw data and/or processed data. In other embodiments, the data may also include asynchronous data and/or bisynchronous data. Bisynchronous data refers to binary-coded data transmitted as a serial stream of binary digits using, for example, a synchronous serial connection (e.g. modem, etc.). In even still other embodiments, the data may include any type of media content [e.g. video/audio (MP3, high-definition, etc.)], digital data, analog data, Photoshop® files, SAPS server data, computer code, etc. As an option, the data received in operation 101 may take the form of a single file. Of course, in the context of the present description, the term data may refer to any data capable of being transmitted in the manner that will now be set forth.

Specifically, the data is divided into a plurality of portions, as shown in operation 102. In the context of the present description, such portions may each refer to any fraction of the data. It should be noted that the different portions may or may not be the same size, have the same format, etc.

Further, the data may be divided utilizing a processor, such as a media communications processor (MCP), for example. More information regarding such exemplary embodiment will be set forth during the description of subsequent figures. Of course, the data may be divided utilizing any device capable of dividing the data into portions.

In various optional embodiments, the data may be intelligently divided in any one of a variety of ways. For example, the data may be divided according to at least one factor. In one embodiment, the data may be divided based on the contents thereof. In another embodiment, the data may be divided based on a priority thereof. In yet another embodiment, the data may be divided based on available bandwidths of associated data connections, a number of available data connections, etc. Of course, in still other embodiments, the data may be divided independent of such (or any other) factors.

Next, the portions of the data may be transmitted among a plurality of types of data connections. See operation 103. In other words, at least a first portion of the data is transmitted utilizing a first type of data connection, and at least a second portion of the data is transmitted utilizing a second type of data connection. It should be noted that the aforementioned data connections may include any two or more data connections that are of a different type. In the context of the present description, data connections of a different type refer to any data connections that are different with respect to at least one aspect thereof.

In embodiments where a network is involved, the data connections may include network data connections. Of course, such network data connections may connect to any desired type of network including, but not limited to a local area network (LAN), a wide area network (WAN) such as the Internet, a wireless network, a peer-to-peer network, etc. Examples of specific data connections will now be set forth. It should be noted that such examples are set forth for illustrative purposes only and should not be construed as limiting in any manner whatsoever.

In one embodiment, at least one of the data connections may include a Home Phoneline Networking Alliance (HPNA) data connection, for example. The HPNA data connection may be provided for interoperable, home-networked devices using existing phone wiring, etc.

As another example, the data connections may also include a home plug data connection. Home plug data connections provide standards for home communications through power line carriers. Specifically, such data connections connect devices to each other through power lines in a building (e.g. home, office, etc.).

In another embodiment, the data connections may include a wireless fidelity (WiFi) data connection. WiFi refers to wireless local area networks (WLANs) that use specifications conforming to IEEE 802.11.

Of course, the data connections may further include any other type of data connection including, but not limited to a Bluetooth data connection, an Ethernet data connection, a 1394 data connection, an analog/digital data connection, a universal serial bus (USB) connection, parallel data connection, and/or any other type of data connection capable of transmitting the portions of data.

In one optional example of use, the types of data connections may be intelligently selected for transmitting the data portions. Specifically, the data connections may be selected according to at least one factor. Of course, different portions of the data may or may not be subject to the same selection-related factor(s). Various examples of different selection-related factors will now be set forth. It should be noted, however, that such intelligent selection is strictly optional, and any technique (e.g. random algorithms, etc.) may be used which results in the portions of the data being transmitted among a plurality of types of data connections.

In one embodiment, the data connection may be selected based on at least one aspect of the different types of data connections. For example, the data connection may be selected based on a bandwidth of the different types of data connections, a latency of the different types of data connections, and/or any other aspect associated with any of the different types of data connections.

In another embodiment, the data connection may be selected based on at least one aspect of the data or at least one of the portions thereof. In particular, the data connection may be selected based on a priority of the data or at least one of the portions thereof, a size of the data or at least one of the portions thereof, whether the data or at least one of the portions thereof is asynchronous or bisynchronous, and/or a content type associated with the data or at least one of the portions thereof. Additionally, the portions of the data may be communicated according to a priority associated therewith. Of course, the data connection may be selected based on any aspect associated with the data or at least one of the portions thereof.

In yet another embodiment, the data connection may be selected based on at least one environmental factor. Just by way of example, the data connection may be selected based on whether a bandwidth of each of the data connections is capable of being sustained in view of such environmental factor. In other embodiments, the data connection may be selected based on the types of data connections which are currently available for transmitting the data portions.

As yet another option, the foregoing factors, and particularly those associated with the data connections, may be continuously or periodically monitored so that the foregoing intelligent decision making may also be continuously or periodically updated. To this end, the way the data is divided and/or the way the data connections are selected may be altered to adapt to changing factors.

While the foregoing embodiments have related to data transmission, other embodiments may optionally involve data receipt. In such embodiments, a plurality of portions of data is received utilizing a plurality of different types of data connections. Such portions may then be reassembled. Of course, it should be noted that the data receipt embodiments may be utilized in a particular system with or without inclusion of the various features of the data transmission embodiments.

To this end, data may be divided into portions, and such portions may be transmitted utilizing a plurality of types of data connections. Further, since the data may optionally be divided based on any number of factors and/or data connections may optionally be selected based on any number of factors, data transmission (e.g. throughput, etc.) may be additionally enhanced. Various examples of such optional enhancements will be set forth later during reference to subsequent figures.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
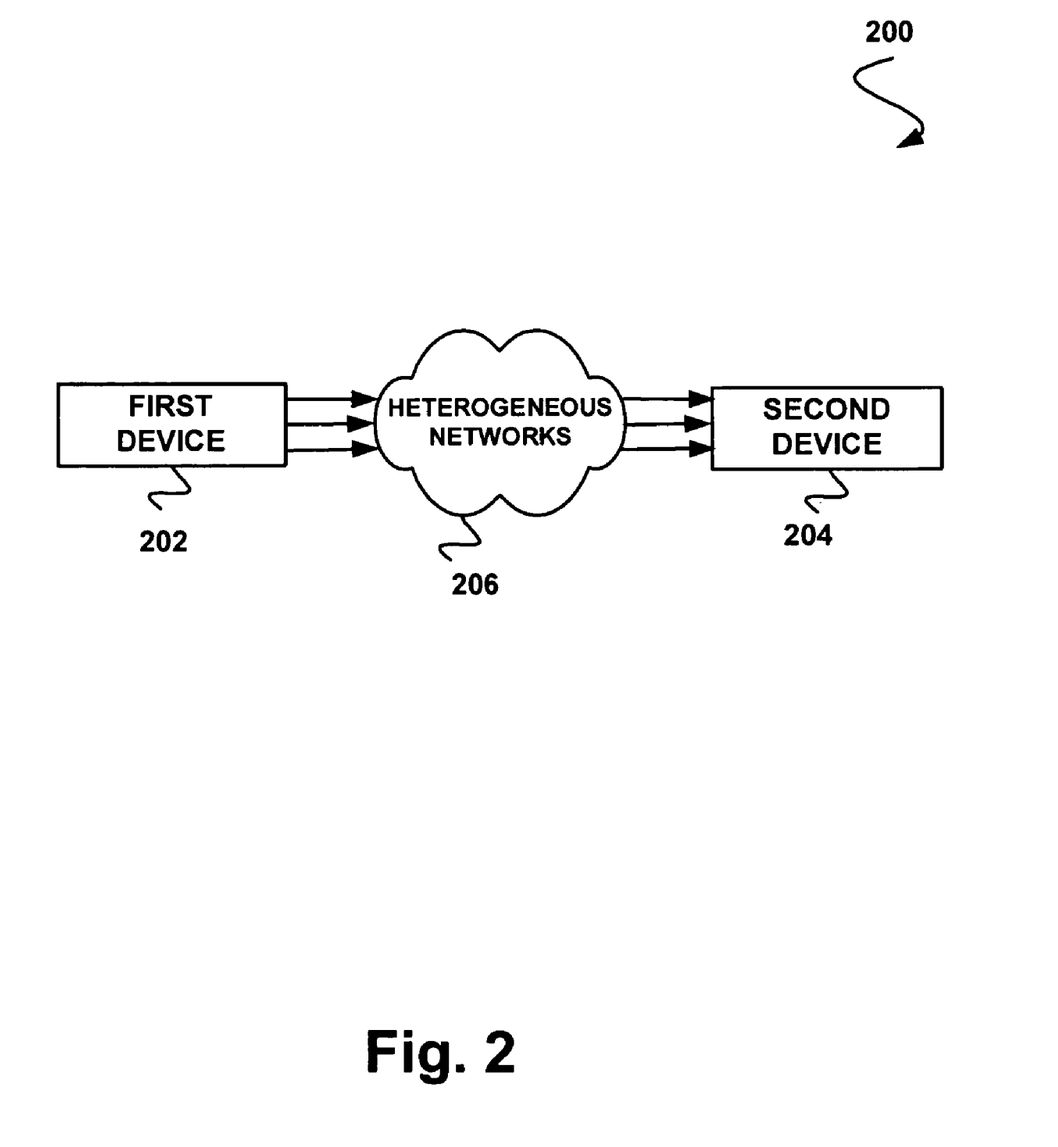
FIG. 2 shows a system for communicating data between two devices utilizing heterogeneous networks, in accordance with another embodiment.

FIG. 2 shows a system 200 for communicating data between two devices utilizing heterogeneous networks, in accordance with another embodiment. As an option, the present system 200 may be the subject of the method 100 of FIG. 1. Of course, however, the system 200 may be used in any desired environment. Still yet, the above definitions may apply during the following description.

As illustrated, a first device 202 is connected to a plurality of heterogeneous networks 206. While the current and following embodiments are set forth in the context of various heterogeneous networks, it should be noted that other data connections (e.g. USB, etc.) without necessarily having an associated network are also contemplated. In addition, the plurality of heterogeneous networks 206 is connected to a second device 204. The first device 202 may include any device capable of providing data to a plurality of networks for transmission purposes, and the second device 204 may include any device capable of receiving data from the heterogeneous networks 206.

For example, the first device 202 and the second device 204 may include, but are not limited to a server computer, desktop computer, lap-top computer, hand-held computer, mobile phone, personal digital assistant (PDA), input/output (I/O) device (e.g. camera, etc.), game console, set-top-box, any component of a computer, and/or any other type of logic for that matter. Of course, the first device 202 and the second device 204 may or may not be of the same type.

In use, the first device 202 may be capable of receiving data, processing (e.g. encoding, compressing, etc.) the data, dividing the data into portions, and optionally assigning headers to the portions. As an option, the first device 202 may be capable of monitoring various aspects of the data itself, and/or an available bandwidth/latency of the heterogeneous networks 206. As a further option, the heterogeneous networks 206 may further be capable of self-monitoring, such that they may each monitor their associated bandwidth availability and/or latency, etc. Still yet, the second device 204 may be capable of reassembling data received from the heterogeneous networks 206.

Thus, for each portion of the data, the first device 202 may select a data connection and corresponding network within the heterogeneous networks 206 to utilize in the transmittal of the portion of data. The appropriate network 206 may then transmit the associated portion(s) of data to the second device 204. In this way, a plurality of heterogeneous networks 206 may be utilized to transmit data between the first device 202 and the second device 206, therefore increasing the efficiency of the data transmittal.

Figure 3A:
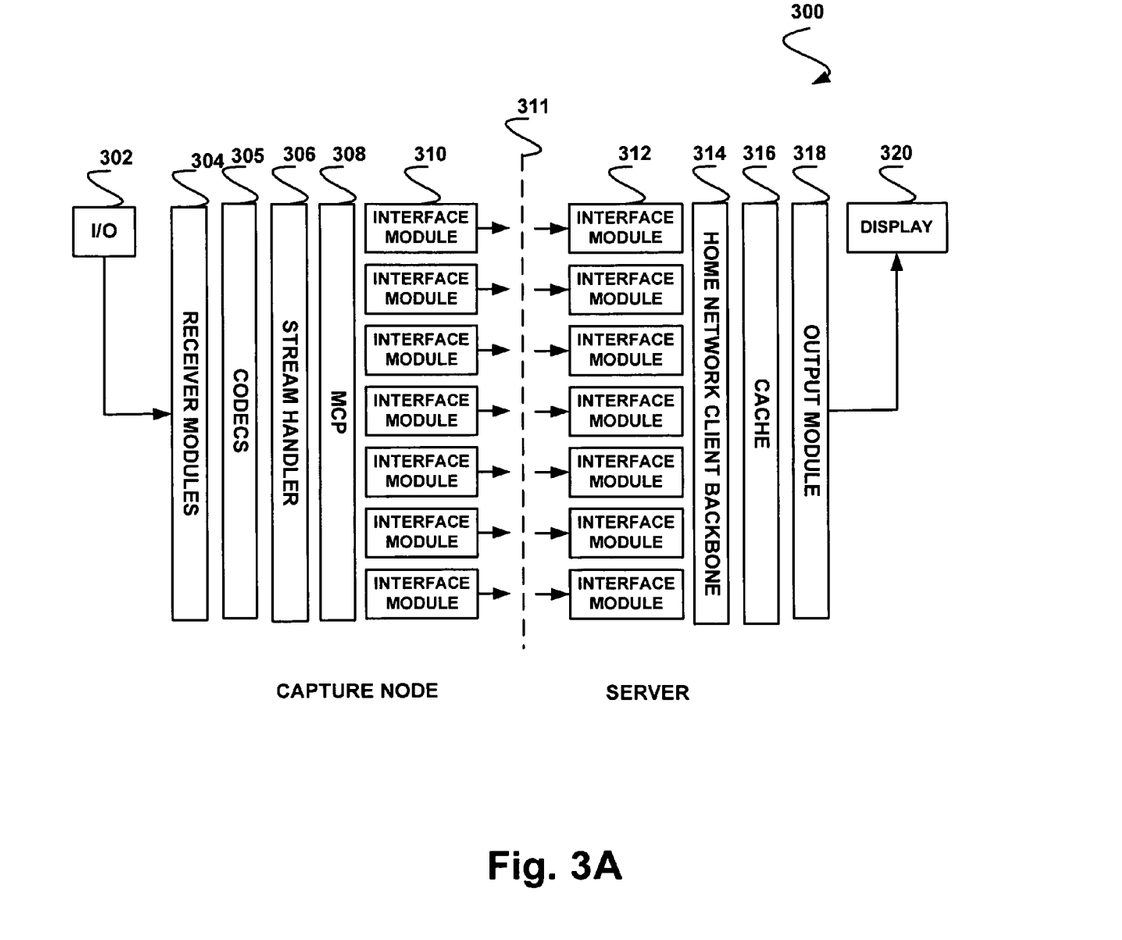
FIG. 3A shows a system for communicating data between a capture node and a server utilizing a plurality of types of data connections, in accordance with yet another embodiment.

FIG. 3A shows a system 300 for communicating data between a capture node and a server utilizing a plurality of types of data connections, in accordance with yet another embodiment. As an option, the present system 300 may be the subject of the method and/or architecture of FIGS. 1 and/or 2. Of course, however, the system 300 may be used in any desired environment. Still yet, the above definitions may apply during the following description.

As shown, a capture node may send data over a heterogeneous network 311 to a server, in the context of a server-to-server environment. Specifically, an I/O device 302 may transmit data to at least one receiver module 304. As an option, the receiver module 304 may process (e.g. digitize, retrieve via DMA in the context of MPEG transport streams, etc.) the data or portions thereof.

In various embodiments, the data may be received by the receiver module(s) 304 utilizing a composite video broadcast signal (CVBS), an S-Video connection, a component video connection, a Sony-Philips Digital Interface Format (SPDIF) connection, a 1394 connection (e.g. digital video, high definition, etc.), a universal serial bus (USB) connection, a high definition (HD) component connection, a transition minimized differential signaling (TMDS) connection, and/or any other type of connection.

A codecs module 305 may be provided to subsequently receive the data and further process the same. For instance, the codecs module 305 may transcode the data to assure compatibility with a destination device associated with the data. As another example, the codecs module 305 may compress the portions of data for optimal network transmittal. Of course, the codecs module 305 may process the portions of data in any desired related manner.

Still yet, a stream handler 306 may manage the data being sent to a MCP 308. The MCP 308, and/or optionally a central processing unit (CPU), may divide the data into portions. As an option, the MCP 308 may or may not engage in intelligent data division utilizing any of the techniques set forth during the description of FIG. 1. The MCP 308 may also prioritize the portions of data.

Furthermore, the MCP 308 may transmit the portions of data over the heterogeneous network 311 utilizing a plurality of network interface modules 310 each associated with a corresponding data connection of the capture node. For example, a data connection may be separately selected for transmitting each portion of data. As an option, the MCP 308 may or may not engage in intelligent data connection selection utilizing any of the techniques set forth during the description of FIG. 1.

The MCP 308 may optionally include a header with each of the portions of data. For instance, the headers may include beginning and end data, transport data, error correction data, data size information, transmission mode data (e.g. an indication whether the data is being uni-casted or multi-casted, etc.), contents identification information and/or any other information capable of being associated with the data and/or portions thereof. Still yet, such headers may optionally be included in addition to headers associated with lower layer processing (e.g. TCP/IP, etc.). Further, the aforementioned headers and/or any other information may be used to route and record the data portions so that reassembly may occur at the appropriate destination.

The portions of data may then be received over the heterogeneous network 311 utilizing a plurality of network interface modules 312 associated with the server. The network interface modules 312 may then send the portions of data to a home network client backbone 314. The home network client backbone 314 may be utilized for reassembling the portions of data.

As an option, the portions of data may be reassembled into the original data sent by the I/O device 302. As another option, the home network client backbone 314 may reassemble the portions of data into the processed data that was sent to the MCP 308. Furthermore, the portions of data may be reassembled utilizing the headers associated with each of the portions of data.

The reassembled data may then be stored in a cache 316. In addition, the reassembled data may be output and/or content managed utilizing an output module 318. As shown, the reassembled data may be output to a display device 320. Of course, the reassembled data may optionally be output to any type of memory (e.g. ROM, archive, etc.), and any presentation-type device (e.g. audio, etc.) may be used in various embodiments.

As another option, the reassembled data may be processed by the output module 318. For example, the reassembled data may be decompressed utilizing the output module 318. To accomplish this, a compression algorithm may be identified utilizing the headers associated with each of the portions of data making up the reassembled data.

As mentioned earlier, the MCP 308 (and/or other logic) may or may not engage in intelligent data division and/or data connection selection utilizing any of the techniques set forth during the description of FIG. 1. In the context of one example, it may first be determined that data is representative of a large (e.g. high-quality, etc.) streaming full-length video having a high priority. It may be further determined that five data connections are available, three of which have large amounts of available bandwidth and low latency, one of which has a very little amount of available bandwidth and high latency, and another one of which is a wireless data connection. Still yet, a high level of ambient interference may be detected in the environment.

The foregoing factors may be utilized in any one of a variety of ways. For example, due to the detected high level of ambient interference, it may be decided not to use the wireless connection, because such interference would render such wireless connection useless. Further, since the content has a streaming format and a high priority, and is large in size (e.g. requiring a bandwidth greater than any one of the network connections, etc.); it may be decided that all of the remaining available connections be utilized (even the limited connection, for that matter). Still yet, a size of the portions may be tailored to accommodate such number of connections to allow for optimal multiplexing, load balancing, etc. Even still, a size of the portions allocated to the limited connection may be smaller with respect to the others.

As a further option, any one or more of the foregoing factors may be continuously or periodically monitored so that the foregoing intelligent decision making may also be continuously or periodically updated, in order to adapt to changing factors. In this way, data may be optimally communicated between a capture node and server utilizing a plurality of types of data connections.

Figure 3B:
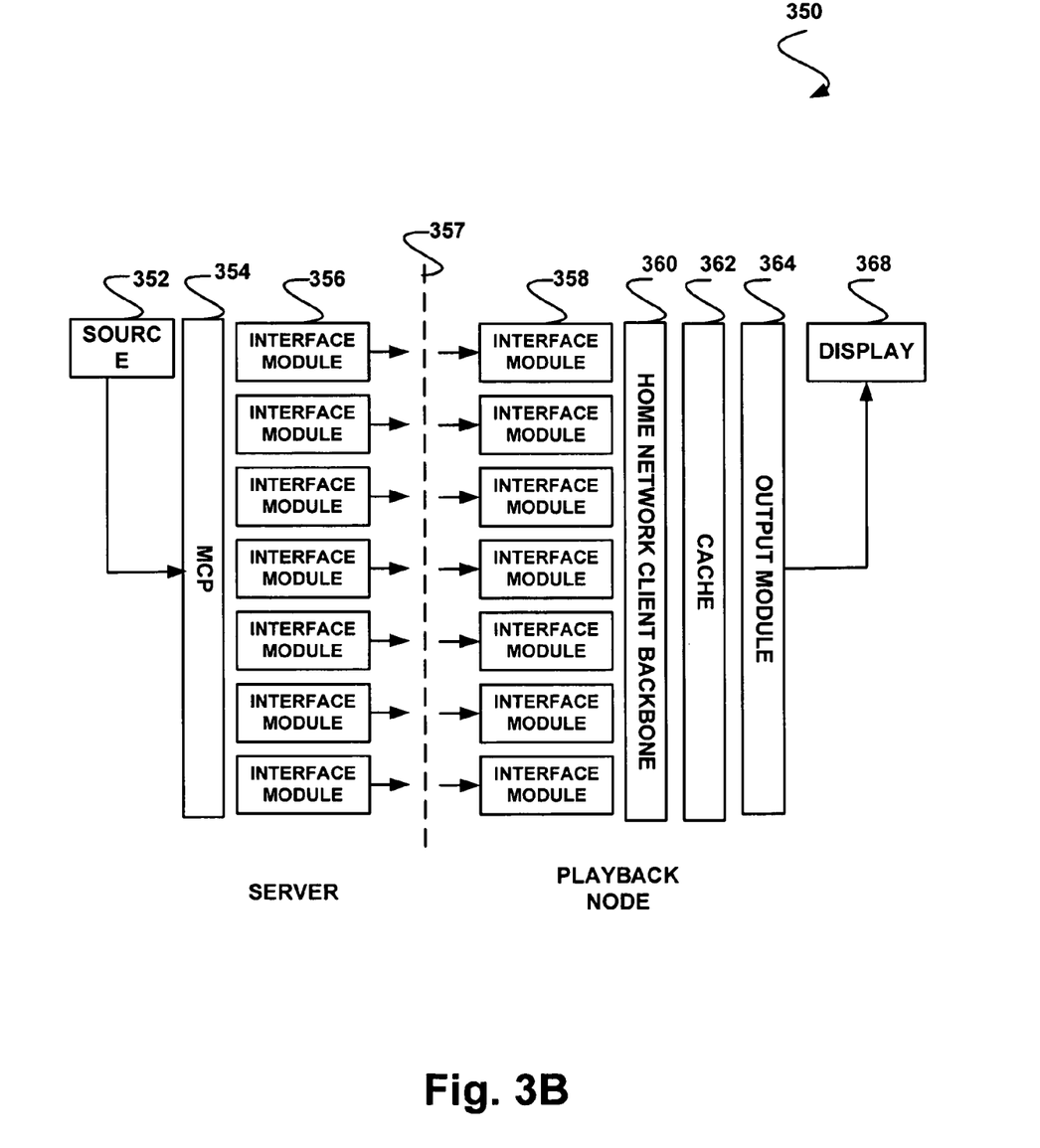
FIG. 3B shows a system for communicating data between a server and a playback node utilizing a plurality of types of data connections, in accordance with still yet another embodiment.

FIG. 3B shows a system 350 for communicating data between a server and a playback node utilizing a plurality of types of data connections, in accordance with still yet another embodiment. As an option, the present system 350 may be implemented in the context of the architecture and environment of FIGS. 1-3A. Of course, however, the system 350 may be used in any desired environment. Still yet, the above definitions may apply during the following description.

As shown, a server may send data over a heterogeneous network 357 to a playback node. Such server may optionally include the server described above with respect to FIG. 3A. Specifically, data is sent from a source 352 to an MCP 354 associated with the server. The source may include any source device capable of transmitting data to the MCP 354. The MCP 354 and/or a CPU may process and/or divide the data into portions. Such portions may then be transmitted over the heterogeneous network 357 utilizing a plurality of network interface modules 356. In addition, as mentioned before, headers may be included with each of the portions of data.

Further, the portions of data may be received at a plurality of network interface modules 358 associated with the playback node. The network interface modules 358 may then send the portions of data to a home network client backbone 360. The home network client backbone 360 may be utilized for reassembling the portions of data. As an option, the portions of data may be reassembled into the original data sent out by the source device 352. Furthermore, the portions of data may be reassembled utilizing the headers associated with each of the portions of data.

The reassembled data may then be stored in a cache 362. In some embodiments, the cache 362 may be sized and managed to sufficiently accommodate various issues occurring during reassembly. For example, if there is a need for some error correction, the issuance of a retry command or signal, etc., other data connections may be accommodated and held off appropriately, in the meantime, using a sufficiently-sized cache 362. Further, the cache may operate under the control of intelligent logic in order to track and/or manage data incoming via the different data connections and reassembling the same. Still yet, while shown to reside at the receiving end, similar caching techniques may or may not be employed at a transmitting end of a communication.

In addition, the reassembled data may be output and/or content managed utilizing an output module 364. As shown, the reassembled data may be output to a display device 368. For instance, the reassembled data may be output to a display device capable of playing back the data initially received from the source device 352. Of course, as mentioned earlier, any presentation-type device (e.g. audio, etc.) may be used in various embodiments.

As another option, the reassembled data may be decompressed prior to being output utilizing the output module 364. As yet another option, the reassembled data may be decoded prior to being output utilizing the output module 364. Of course, the reassembled data may be processed in any desired manner prior to being output by the output module 364. In this way, data may be communicated between a server and a playback node utilizing a plurality of types of data connections.

In still an additional embodiment, the foregoing techniques may be used to encrypt data, since the data portions may be incomprehensible when taken individually, until they have been reassembled. Thus, a nefarious server which intercepts such portions of data would be unable to reassemble the data in its entirety.

Figure 4:
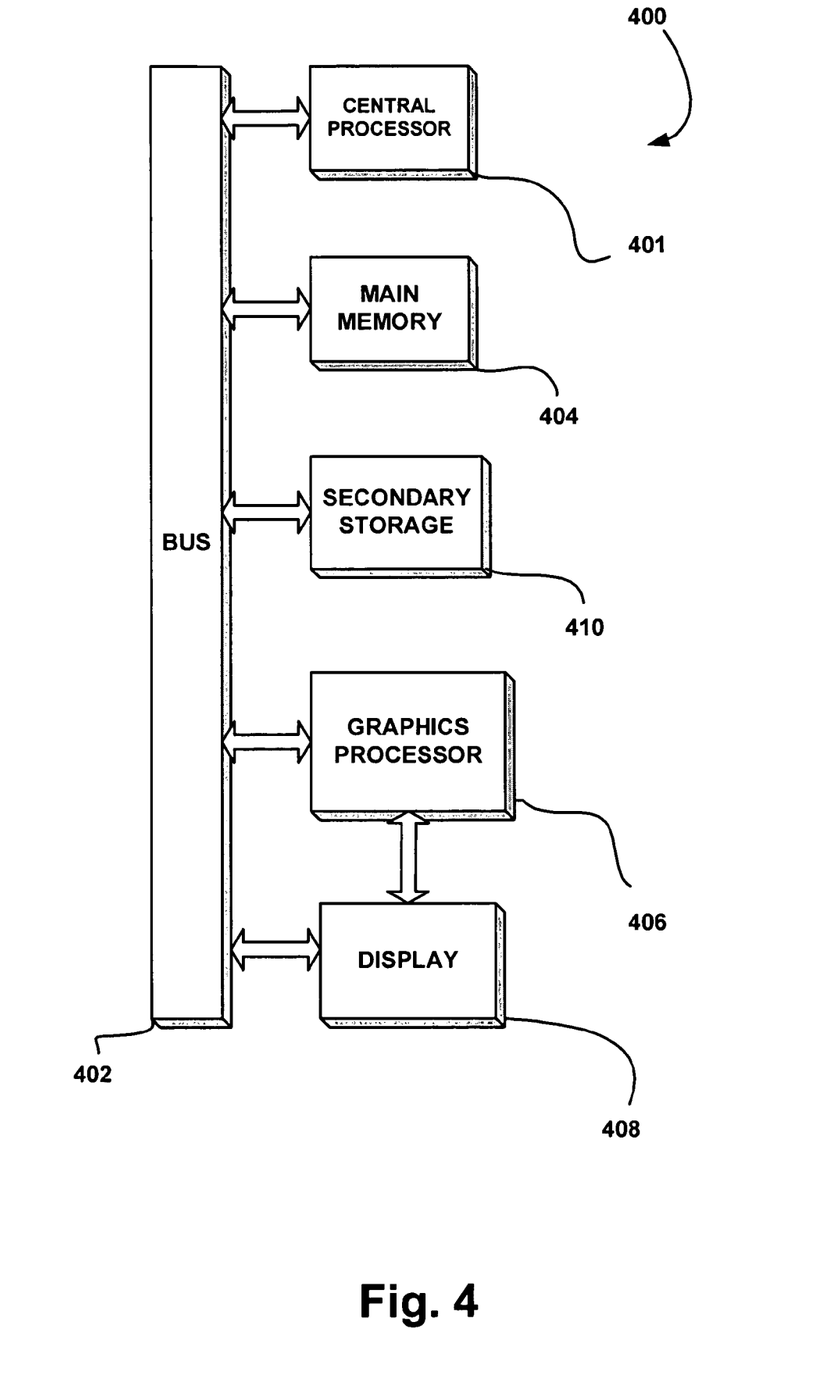
FIG. 4 illustrates an exemplary computer system in which the various architecture and/or functionality of the various previous embodiments may be implemented.

FIG. 4 illustrates an exemplary computer system 400 in which the various architecture and/or functionality of the various previous embodiments may be implemented. For example, the various devices described during the description of FIGS. 1-3B may optionally take the following form.

As shown, a computer system 400 is provided including at least one host processor 401 which is connected to a communication bus 402. The computer system 400 also includes a main memory 404. Control logic (software) and data are stored in the main memory 404 which may take the form of random access memory (RAM).

The computer system 400 also includes a graphics processor 406 and a display 408, i.e. a computer monitor. In one embodiment, the graphics processor 406 may include a plurality of shader modules, a rasterization module, video processing module, motion estimation module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The computer system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the computer system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
dividing data into a plurality of portions of the data based on a number of available data connections, a size of each of the portions of the data tailored to the number of available data connections;
selecting one of a plurality of different types of the available data connections for transmitting each portion of the data, wherein the selection is based on at least one environmental factor and wherein the one of the different types of the available data connections for transmitting each portion of the data is selected based on whether a bandwidth of each of the available data connections is capable of being sustained in view of the at least one environmental factor;

transmitting the portions of the data utilizing the plurality of different types of the available data connections, according to the selection;

monitoring the available data connections, and determining that utilization of a particular one of the available data connections is affected by the at least one environmental factor; and in response to the determination that utilization of the particular one of the available data connections is affected by the at least one environmental factor, preventing further utilization of the particular one of the available data connections for transmitting additional data;

wherein a header is included with each of the portions of the data;

wherein the header includes information that includes beginning and end data, transport data, error correction data, contents identification information, and transmission mode data;

wherein the particular one of the available data connections includes a wireless connection, and the at least one environmental factor affecting the wireless connection includes a level of ambient interference in an environment, such that further utilization of the wireless connection is prevented in response to the ambient interference in the environment.

2. The method as recited in claim 1, wherein the data connections include network data connections.

3. The method as recited in claim 1, wherein the data connections include at least one of a home phoneline networking alliance (HPNA) data connection, a home plug data connection, a wireless fidelity (WiFi) data connection, a Bluetooth data connection, an Ethernet data connection, a 1394 data connection, a universal serial bus data connection, a parallel data connection, and an analog/digital data connection.

4. The method as recited in claim 1, wherein the dividing further includes dividing the data into the portions based on contents of the data.

5. The method as recited in claim 1, wherein the selection is based on a latency of the different types of the available data connections.

6. The method as recited in claim 1, wherein the selection is based on at least one aspect of the data or at least one of the portions thereof.

7. The method as recited in claim 6, wherein the selection is based on a priority of the data or at least one of the portions thereof.

8. The method as recited in claim 6, wherein the selection is based on whether the data or at least one of the portions thereof is asynchronous or bisynchronous.

9. The method as recited in claim 6, wherein the selection is based on a content type associated with the data or at least one of the portions thereof.

10. The method as recited in claim 1, and further comprising at least one of compressing, digitizing, and retrieving via direct memory access (DMA) the data or the portions thereof.

11. The method as recited in claim 1, wherein the information further comprises data size information.

12. The method as recited in claim 1, wherein the header further comprises headers associated with lower layer processing.

13. The method as recited in claim 1, wherein the transmission mode data includes an indication whether the portion of the data is being uni-casted or multi-casted.

14. The method as recited in claim 1, wherein the dividing further includes dividing the data into the portions based on a priority of the data.

15. The method as recited in claim 1, wherein the data divided into the plurality of portions of the data based on the number of available data connections is divided such that the plurality of portions of the data are in at least two different formats.

16. A method, comprising:

receiving a plurality of portions of data divided into the portions based on a number of available data connections utilizing a plurality of different types of the available data connections, a size of each of the portions of the data tailored to the number of available data connections, wherein one of a plurality of different types of the available data connections are selected for transmitting each portion of the data by which the plurality of portions of data are received, wherein the selection is based on at least one environmental factor and wherein the one of the different types of the available data connections for transmitting each portion of the data is selected based on whether a bandwidth of each of the available data connections is capable of being sustained in view of the at least one environmental factor; and reassembling the portions of the data;

wherein a header is included with each of the portions of the data;

wherein the header includes information that includes beginning and end data, transport data, error correction data, contents identification information, and transmission mode data;

wherein the available data connections are monitored, and it is determined that utilization of a particular one of the available data connections is affected by the at least one environmental factor;

wherein, in response to the determination that utilization of the particular one of the available data connections is affected by the at least one environmental factor, further utilization is prevented of the particular one of the available data connections for transmitting additional data;

wherein the particular one of the available data connections includes a wireless connection, and the at least one environmental factor affecting the wireless connection includes a level of ambient interference in an environment, such that further utilization of the wireless connection is prevented in response to the ambient interference in the environment.

17. A system, comprising:

a plurality of different types of available data connections; and an interface for interfacing the available data connections to communicate a plurality of portions of data utilizing the different types of the available data connections;

wherein a header is included with each of the portions of the data;

wherein the header includes information that includes beginning and end data, transport data, error correction data, contents identification information, and transmission mode data;

wherein the system is operable such that the data is divided into the portions of the data based on a number of the available data connections, and a size of each of the portions of the data is tailored to the number of available data connections;

wherein the system is operable such that one of a plurality of different types of the available data connections are selected for communicating each portion of the data, wherein the selection is based on at least one environmental factor and wherein the one of the different types of the available data connections for transmitting each portion of the data is selected based on whether a bandwidth of each of the available data connections is capable of being sustained in view of the at least one environmental factor;

wherein the system is operable such that the available data connections are monitored, and it is determined that utilization of a particular one of the available data connections is affected by the at least one environmental factor;

wherein the system is operable such that, in response to the determination that utilization of the particular one of the available data connections is affected by the at least one environmental factor, further utilization is prevented of the particular one of the available data connections for transmitting additional data;

wherein the particular one of the available data connections includes a wireless connection, and the at least one environmental factor affecting the wireless connection includes a level of ambient interference in an environment, such that further utilization of the wireless connection is prevented in response to the ambient interference in the environment.

18. The system as recited in claim 17, wherein the interface is provided utilizing a central processing unit and memory in communication via a bus.

* * * * *